G. Rugg,
Gage Lathe.
N° 30,046. Patented Nov. 13, 1860.
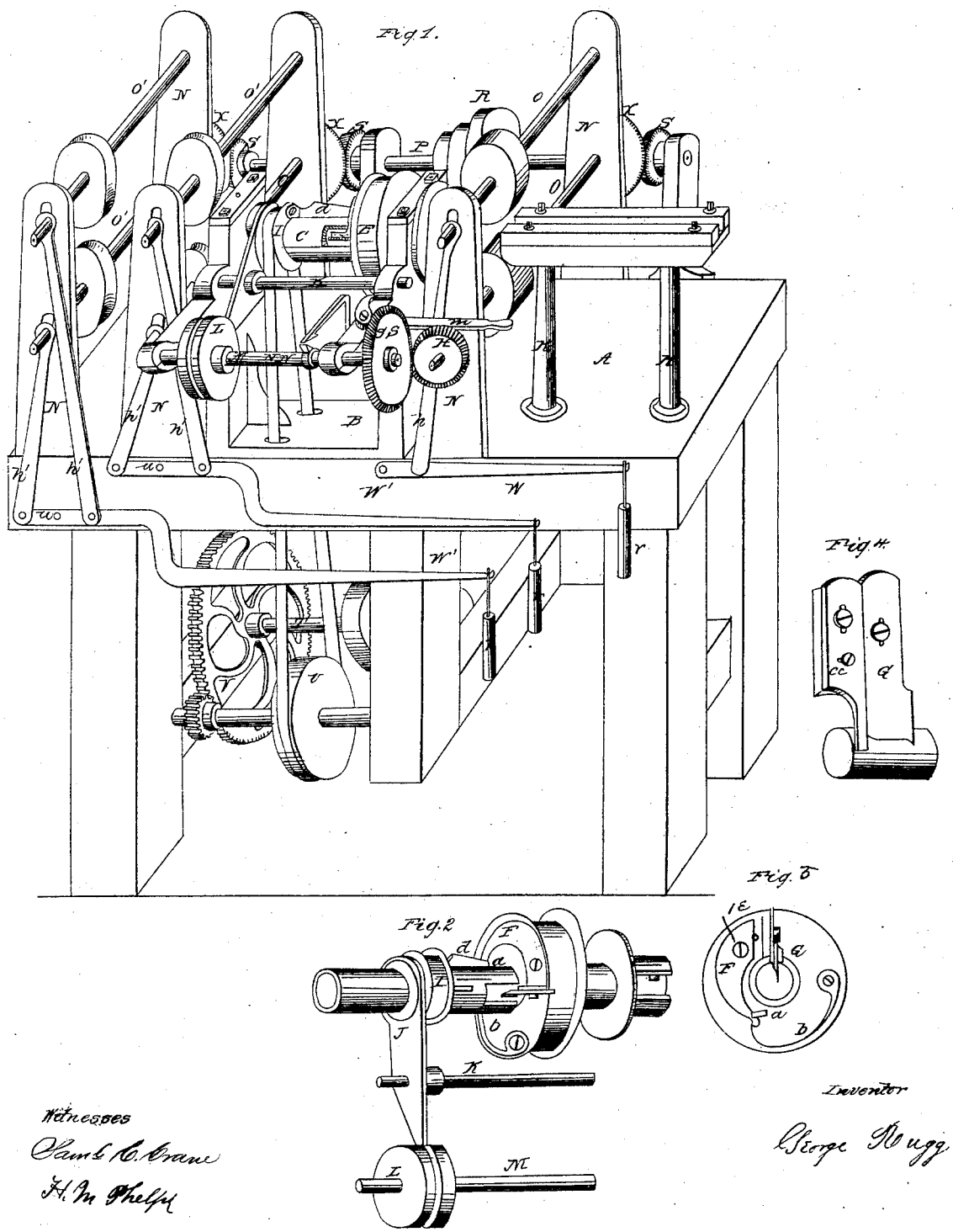
Witnesses
Saml C. Crane
H. M. Phelps
Inventor
George Rugg

UNITED STATES PATENT OFFICE.

GEORGE RUGG, OF POTSDAM, NEW YORK.

TURNING-MACHINE.

Specification of Letters Patent No. 30,646, dated November 13, 1860.

*To all whom it may concern:*

Be it known that I, GEORGE RUGG, of Potsdam, in the county of St. Lawrence and State of New York, have invented a new and Improved Turning-Machine for turning wood; and I do hereby declare that the following is a full and exact description of the construction and operation of the same, reference being had to the accompanying drawings and to the letters of reference marked thereon.

The nature of my invention consists in providing a hollow mandrel with cutting-tools, and adjusting and operating the same for turning wood into various patterns.

To enable others skilled in the art to make and use my invention I will proceed to describe its construction and operation.

Figure 1 is a perspective view of the machine. Fig. 2 represents the mandrel and its attachments, also a clutch and revolving pattern in position as attached to the lathe block. Fig. 3, represents the tool and tool-stock as adjusted to the revolving disk or pulley. Fig. 4 shows the finishing-tool and guard in position for turning.

A is the frame of the machine.

C is the hollow-mandrel, secured to the lathe-block in boxes which allow a free rotary motion. Attached to the front ends of the mandrel is a cutting-tool which prepares the stick to pass through.

B is the lathe block.

E is the driving-pulley on the mandrel. There is a tool-stock F (with cutting-tool G) attached to the side of pulley E, by a bolt $k$, which is the axis of motion, which "axis" allows the tool-stock a rocking motion for the purpose of producing swells and tapers or beaded work. A spring $b$ holds down the end of the tool-stock which is operated upon by an arm $d$, projecting from collar I.

The operating surface of arm $d$, is an inclined plane (see Figs. 1 and 2) which has connection with pulley E in a slot at $a$, (see Fig. 3) partly under the end of the tool-stock F which is rocked on its axis by the longitudinal vibrations of the inclined plane.

I is a collar and pulley combined, which revolves with the mandrel by means of a rib which allows the collar to slip sideways while revolving.

C, C, is a guard attached to the tool-stock close by the side of tool G, projecting beyond the tool over the stick for the purpose of preventing the tool from catching the stick as the last end passes by.

J is a clutch firmly attached to a sliding bar K which is secured to the front side of the lathe block. One end of the clutch J has connection with collar I, by means of a groove; and the other end of the clutch is operated upon by a revolving pattern L on shaft M, as seen adjusted to the lathe-block in Fig. 1.

N, N, N, N, N, N, are standards which support six feeding rollers and shafts $o'$, $o'$, $o'$, $o'$, $o$, $o$.

P is a shaft which carries three pinions S, S, S, which drive three gear wheels X, X, X, on the lower feed-roller shafts.

R represents a cone pulley on shaft P which is driven by a belt (not seen) connecting with a cone pulley on shaft T.

U is a pulley on shaft V which carries a pinion that drives gear wheel on shaft T. The pulley U, is driven by a belt from collar I which has a proper face, and proper flanges for the purpose.

W, W', W', are three levers connected to the feed roller shafts by connecting rods $h'$, $h'$, $h'$, $h'$, $h$.

$r$, $r$, $r$, are weights that hold the levers down.

The short lever W is attached to the frame by a bolt through the end, and is connected by a rod $h$ to the front upper roller shaft. The operation of this lever upon the roller, compensates for any variation in the size of the stick being turned, which is carried forward by being held down on the lower grooved feed roller.

The long bent levers W', W' are attached to the frame by bolts $n$ and $n$. Each of these levers operate two feeding rollers behind the mandrel, by means of the connecting rods $h'$, $h'$, and $h'$, $h'$, which are attached to the levers at equal distances on each side of the bolts $n$ and $n$.

The two shortest connecting rods are attached to the ends of the two lower feed roller shafts and to the ends of the levers. The two longest connecting rods are attached to the levers on the opposite side of the bolts, and also attached to the ends of the two upper feed roller-shafts. By this arrangement and connection of the levers with the feeding rollers, one lever operates two rollers,—giving them a reciprocating and adjustive action, always pressing firmly upon the stick—expanding or contracting to adjust themselves to any variation in the size, and invariably keeping the stick on a line central to the mandrel, and also hold the stick from rotating, and continue the feed through, completing the operation. The face of these rollers are fluted to prevent crushing the stick. A slot in the standards allows the feed roller-shafts to move up and down by the operation of the levers and weights.

S S is a gear wheel on shaft M, which is driven by a pinion H on the lower feed roller shaft, in front of the mandrel. This pinion H rotates with the feed-roller by means of a rib which allows the pinion to slide in or out of gear, by the shipper m. N N is an arm on shaft M adjusted by a set screw which operates a spring, giving an alarm! indicating the time for entering the stick between the rollers.

K' K' support a rest in front of the feed-rollers, provided with guides which direct the stick into the machine. To put the machine in operation—attach a belt to the driving pulley on the hollow mandrel which communicates motion to the belts that drive the gearing for the feeding rollers and revolving pattern. Place the stick on the rest, and at the "alarm," push it up to the rollers which feed it to the first cutting-tool, which reduces the stick for entering the mandrel. As the stick moves forward, tool G operates upon it by means of the pattern, this pattern operates the clutch which vibrates collar I, and arm d, the inclined plane of which operates the tool-stock F, and tool G, by which operations, the tool cuts the stick according to the shape of the pattern; as the stick issues from the mandrel it enters between the back rollers which carry it through completing the turning in one continuous operation.

I do not claim broadly, as my invention a hollow mandrel with cutting-tools attached and operated so as to turn swells or tapers or beads on wood, as this has been done before in different ways; but What I do claim as my invention and desire to secure by Letters Patent is, in a new mode of constructing arranging and operating devices for the purpose as specified:

1. The tool-stock F as attached and operated by means of the arm (d), the revolving pattern (L,) and clutch (J) as connected and operated in the manner, and for the purpose specified.

2. The mode of attaching and operating the feeding rollers o' o' o' o',—in the manner and for the purpose of holding the stick from turning—and feeding the stick through the machine at one continuous operation substantially as described in the specification.

3. The guard (c c) as adjusted for the purpose specified.

GEORGE RUGG.

Witnesses:
SAML. C. CRANE,
H. M. PHELPS.